(12) United States Patent
Kino et al.

(10) Patent No.: US 8,616,081 B2
(45) Date of Patent: Dec. 31, 2013

(54) SHIFT LEVER DEVICE

(75) Inventors: Keisuke Kino, Hamamatsu (JP); Satoshi Yukishita, Kosai (JP)

(73) Assignee: Fuji Kiko Co., Ltd., Kosai-Shi, Shizuoka-Ken (JP)

( * ) Notice: Subject to any disclaimer, the term of this patent is extended or adjusted under 35 U.S.C. 154(b) by 255 days.

(21) Appl. No.: 13/073,352

(22) Filed: Mar. 28, 2011

(65) Prior Publication Data

US 2011/0239802 A1  Oct. 6, 2011

(30) Foreign Application Priority Data

Mar. 30, 2010  (JP) ................ P2010-078033
Nov. 29, 2010  (JP) ................ P2010-265103

(51) Int. Cl.
    *B60K 20/00*  (2006.01)
(52) U.S. Cl.
    USPC .......................... 74/473.3; 74/473
(58) Field of Classification Search
    USPC ..................................... 74/473.3
    See application file for complete search history.

(56) References Cited

U.S. PATENT DOCUMENTS

| | | | | |
|---|---|---|---|---|
| 4,228,879 A | * | 10/1980 | Woodbury ................. | 192/219.4 |
| 5,249,478 A | * | 10/1993 | Moroto et al. .............. | 74/473.18 |
| 5,388,476 A | * | 2/1995 | Harger et al. ............... | 74/473.1 |
| 6,848,331 B2 | * | 2/2005 | Syamoto .................... | 74/473.23 |
| 6,852,065 B2 | * | 2/2005 | Yamada et al. ............. | 477/99 |
| 6,923,083 B2 | * | 8/2005 | Fujinuma ................... | 74/473.33 |
| 7,114,410 B2 | * | 10/2006 | Nagasawa .................. | 74/473.18 |
| 7,621,198 B2 | * | 11/2009 | Kako et al. ................. | 74/523 |
| 2002/0056334 A1 | * | 5/2002 | Fujinuma .................... | 74/473.1 |
| 2003/0097897 A1 | * | 5/2003 | Yamada et al. ............. | 74/473.21 |
| 2005/0092120 A1 | * | 5/2005 | Sakon et al. ............... | 74/473.1 |
| 2005/0160859 A1 | * | 7/2005 | Buerger et al. ............. | 74/473.1 |
| 2005/0172746 A1 | * | 8/2005 | Waldow et al. ............ | 74/473.18 |
| 2006/0201272 A1 | * | 9/2006 | Syamoto et al. ........... | 74/473.1 |
| 2007/0137357 A1 | * | 6/2007 | Tomida ....................... | 74/473.1 |
| 2008/0041180 A1 | * | 2/2008 | Cho ............................. | 74/473.1 |
| 2008/0295632 A1 | * | 12/2008 | Terradas Prat ............. | 74/473.3 |
| 2011/0138953 A1 | * | 6/2011 | Durfee ........................ | 74/473.1 |
| 2012/0000311 A1 | * | 1/2012 | Shioji et al. ................ | 74/473.3 |

FOREIGN PATENT DOCUMENTS

| | | | | |
|---|---|---|---|---|
| JP | 06-080040 A | | 3/1994 | |
| JP | 06080038 A | * | 3/1994 | ............ B60K 20/02 |
| JP | 07-286658 A | | 10/1995 | |

* cited by examiner

*Primary Examiner* — Troy Chambers
*Assistant Examiner* — Zakaria Elahmadi
(74) *Attorney, Agent, or Firm* — Nath, Goldberg & Meyer; Jerald L. Meyer; Sanjana Mangalagiri

(57) ABSTRACT

A shift lever device includes: a body case configured to pivotally support a shift lever swingably; a circuit board including a electric component disposed on a board of the circuit board; a board cover including a housing part housing the circuit board in the board cover and configured to be mounted to the body case with the circuit board being housed in the housing part; a board supporting part provided to the board cover and configured to support the circuit board in the housing part; and an electric component supporting part provided to any one of the body case and the board cover and configured to support the electric component disposed on the circuit board. The circuit board is configured to be supported to the body case via the board cover.

12 Claims, 16 Drawing Sheets

Prior Art ns and 07 286658 disclose related shift lever
SHIFT LEVER DEVICE

CROSS REFERENCE TO RELATED APPLICATION

This application is based upon and claims the benefit of priority from the prior Japanese Patent Application Nos. 2010-078033, filed on Mar. 30, 2010 and 2010-265103, filed on Nov. 29, 2010, the entire contents of which are incorporated herein by reference.

BACKGROUND OF THE INVENTION

1. Field of the Invention

The present invention relates to a shift lever device equipped with electric components.

2. Description of the Related Art

Japanese Unexamined Patent Application Publication Nos. 06-080040 and 07-286658 disclose related shift lever devices. The related shift lever devices electrically detect a position of a shift lever according to on-off of a switch and display a position of the shift lever with illumination. The related shift lever devices include various kinds of electric components mounted to a body case along with a circuit board.

In a shift lever device 101 described in Japanese Unexamined Patent Application Publication No. 06-080040, an electric circuit is formed by a variety of connectors 104a and 104b and a parking position detection switch 104c disposed on a circuit board 104 along with various kinds of circuit components, as illustrated in FIG. 1. The circuit board 104 is fixed to a body case 102, and covered and protected by a board cover 105 to be fixed to the body case 102.

In a shift lever device described in Japanese Unexamined Patent Application Publication No. 07-286658, an electric component 204 such as a solenoid and a shift lock unit 206 are disposed on a bracket 210 provided separately from a circuit board 205 and the bracket 210 is mounted to a body case to mount the electric component 204 on the body case, as illustrated in FIG. 2. The electric component 204 is electrically connected to the circuit board 205 via a connector 204a.

SUMMARY OF THE INVENTION

In the shift lever device 101 described in Japanese Unexamined Patent Application Publication No. 06-080040, there is a possibility that the circuit board 104 is damaged and electric components such as the connectors 104a and 104b drop off due to a load, generated by manipulation of a shift lever or the like, on the parking position detection switch 104c being an electric component on the circuit board 104 because the circuit board 104 is not made strong. For this reason, countermeasures such as increase in the strength of the circuit board 104 or increase in the strength of the fixation of the electric component need to be taken.

In the shift lever device described in Japanese Unexamined Patent Application Publication No. 07-286658, the electric component 204 is fixed to the body case via the bracket 210. For this reason, the shift lever device has enough strength against a load to be imposed thereon. However, the shift lever device necessitates increase in the number of parts and requires a electrical connection of the connector 204a to the circuit board 205 separately from a fixation of the electric component 204 to the bracket 210, thereby resulting in low assembly workability.

An object of the present invention is to provide a shift lever device which is capable of protecting a circuit board from a load being imposed on electric components without degrading assembly workability.

An aspect of the present invention is a shift lever device comprising: a body case configured to pivotally support a shift lever swingably; a circuit board including a electric component disposed on a board of the circuit board; a board cover including a housing part housing the circuit board in the board cover and configured to be mounted to the body case with the circuit board being housed in the housing part; a board supporting part provided to the board cover and configured to support the circuit board in the housing part; and an electric component supporting part provided to any one of the body case and the board cover and configured to support the electric component disposed on the circuit board, wherein the circuit board is configured to be supported to the body case via the board cover.

According to the aspect, the circuit board is mounted to the body case via the board cover while the circuit board is housed in the housing part by the board supporting part and thus the board supporting part receives a load when a load is imposed on the electric component. For this reason, it is possible to protect the circuit board from a load being imposed on the electric component and prevent the occurrence of a bad connection or the like without taking countermeasures such as increase in the strength of the circuit board or increase in the fixation of the electric component and without degrading assembly workability. It is also possible to prevent the occurrence of a bad connection or the like due to an imposition of a load on the circuit board. It is yet possible to improve accuracy of positioning because a positioning of the electric component on the body case is accomplished through the board cover.

The electric component supporting part may be provided to the board cover and include a support portion configured to abut on a receiver portion provided to the electric component with the circuit board being housed in the housing part.

According to this configuration, it is possible to achieve the effects and advantages similar to the above-described aspect.

The electric component supporting part may be provided to the body case and include a support portion configured to abut on a receiver portion provided to the electric component with the circuit board being housed in the housing part and with the board cover being mounted to the body case.

According to this configuration, it is possible to achieve the effects and advantages similar to the above-described aspect.

The receiver portion may be a through hole formed in the electric component, and the support portion may be a stepped shaft tightly disposed in the receiver portion.

According to this configuration, the receiver portion is a through hole formed in the electric component and the support portion is a stepped shaft tightly disposed in the receiver portion, and thus positioning of the electric component and reception of a load can be achieved through the board cover. For this reason, it is possible to improve accuracy of positioning and prevent the occurrence of a bad connection in connection parts of the electric component and the circuit board because displacement between the electric component and the circuit board is prevented when a load is imposed on the electric component.

The receiver portion may be a through hole formed in the electric component, and the support portion may be a shaft tightly disposed in the receiver portion.

According to this configuration, the receiver portion is a through hole formed in the electric component and the support portion is a shaft tightly disposed in the receiver portion, and thus positioning of the electric component and imposition of a load can be achieved through the board cover. For this reason, it is possible to improve accuracy of positioning and prevent the occurrence of a bad connection in connection parts of the electric component and the circuit board because displacement between the electric component and the circuit board is prevented when a load is imposed on the electric component.

The receiver portion may be a protrusion protruding from the electric component, and the support portion may be a cylindrical shaft having a cylindrical wall formed on a distal end of the support portion to fit the protrusion.

According to this configuration, the receiver portion is a protrusion protruding from the electric component and the support portion is a cylindrical shaft to fit the protrusion, and thus positioning of the electric component and imposition of a load can be achieved through the board cover. For this reason, it is possible to improve accuracy of positioning and prevent the occurrence of a bad connection in connection parts of the electric component and the circuit board because displacement between the electric component and the circuit board is prevented when a load is imposed on the electric component.

The circuit board may have a through hole through which the electric component supporting part is disposed and having a diameter greater than a diameter of the electric component supporting part disposed through the through hole.

According to this configuration, a diameter of the through hole is greater than that of the electric component supporting part. Consequently, even when the electric component supporting part is slightly displaced in a direction along a board surface of the circuit board due to a load being imposed on the electric component on the circuit board, a load is not imposed on the circuit board and the circuit board can be protected due to a gap between the through hole and the electric component supporting part. For this reason, it is possible to support the electric component on the board cover with high accuracy and prevent the occurrence of a bad connection or the like between the electric component and the circuit board.

The housing part may include a claw engaged with the electric component, with the circuit board and the electric component both being housed in the housing part in this order, and the circuit board may be configured to be supported in the housing part by an engagement of the claw with the electric component.

According to this configuration, the circuit board is supported in the housing part by an engagement of the claw with the electric component. Consequently, it is possible to simplify an assembly work.

The board cover may include a peripheral wall having a fixing claw to engage with a side wall of the body case for maintaining the board cover in the body case.

The board supporting part may include an engaging claw, a flange, and a stepped shaft, respectively protruding from an inside surface of the board cover. The engaging claw may include a hook-like portion to be engaged with the circuit board on a distal end of the engaging claw. The flange and a stepped portion of the stepped shaft may have a same protruding dimension protruding from the inside surface of the board cover. The circuit board may be securely mounted between the hook-like portion of the engaging claw, and the flange and the stepped portion.

The circuit board may include a shift lock mechanism disposed thereon.

DETAILED DESCRIPTION OF THE EMBODIMENTS

Figure 1:
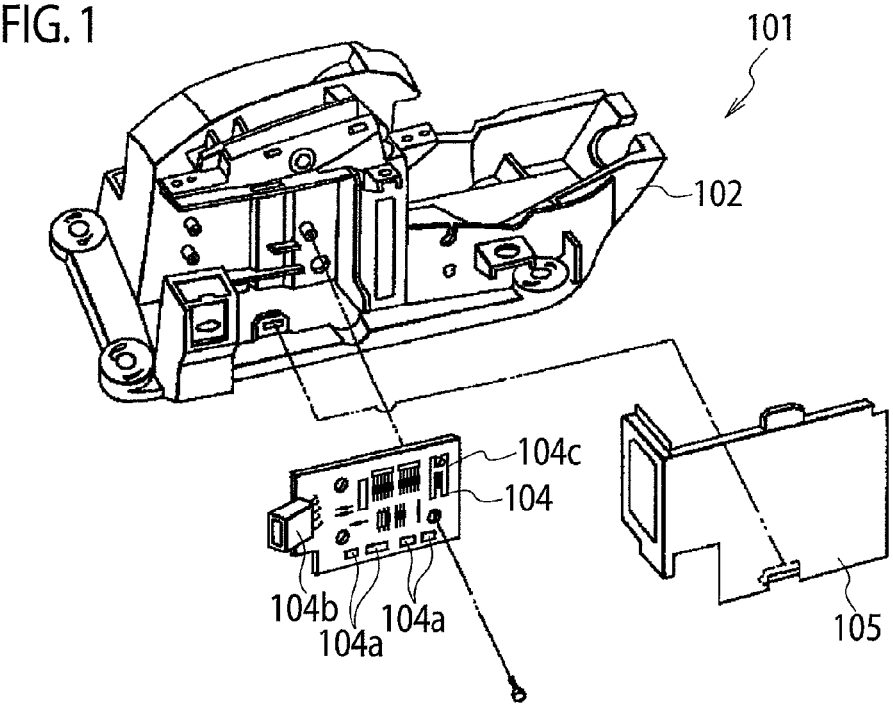
FIG. 1 is an exploded perspective view of a first related shift lever device.
Figure 2:
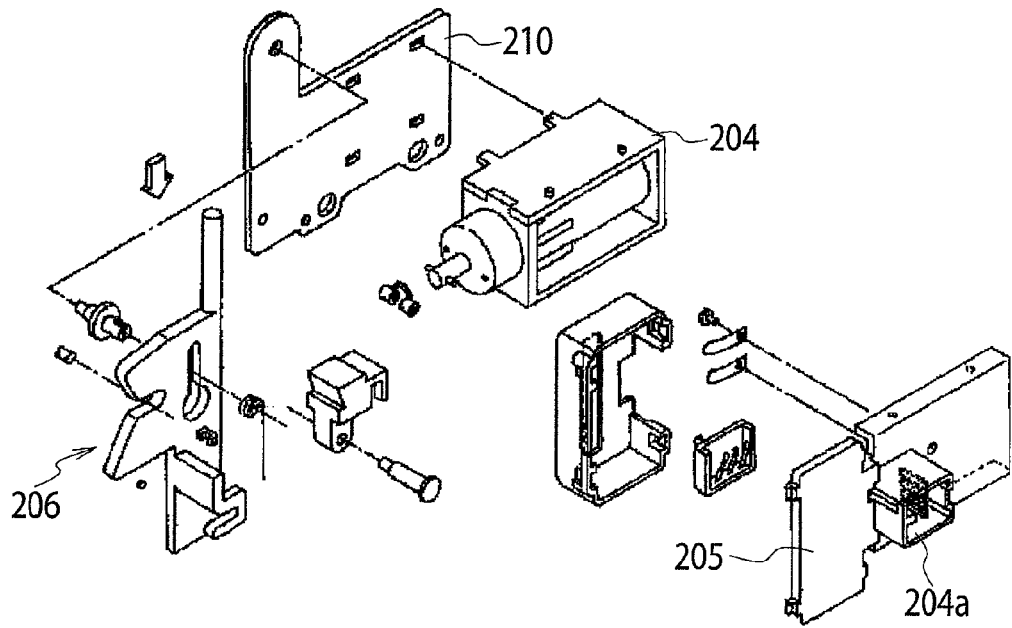
FIG. 2 is an exploded perspective view of a second related shift lever device.
Figure 3:
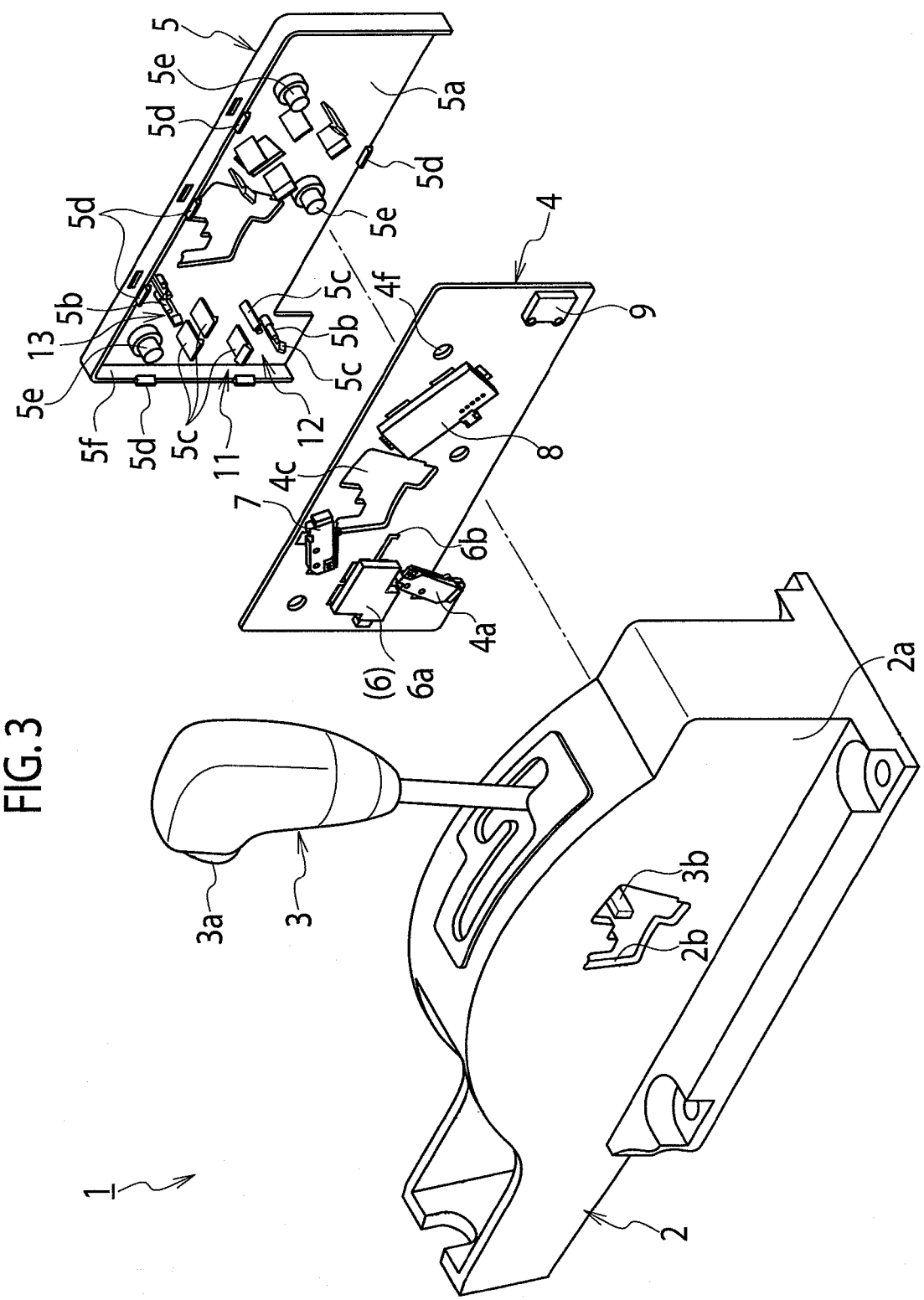
FIG. 3 is an exploded perspective view of a shift lever device according to a first embodiment of the present invention.
Figure 4:
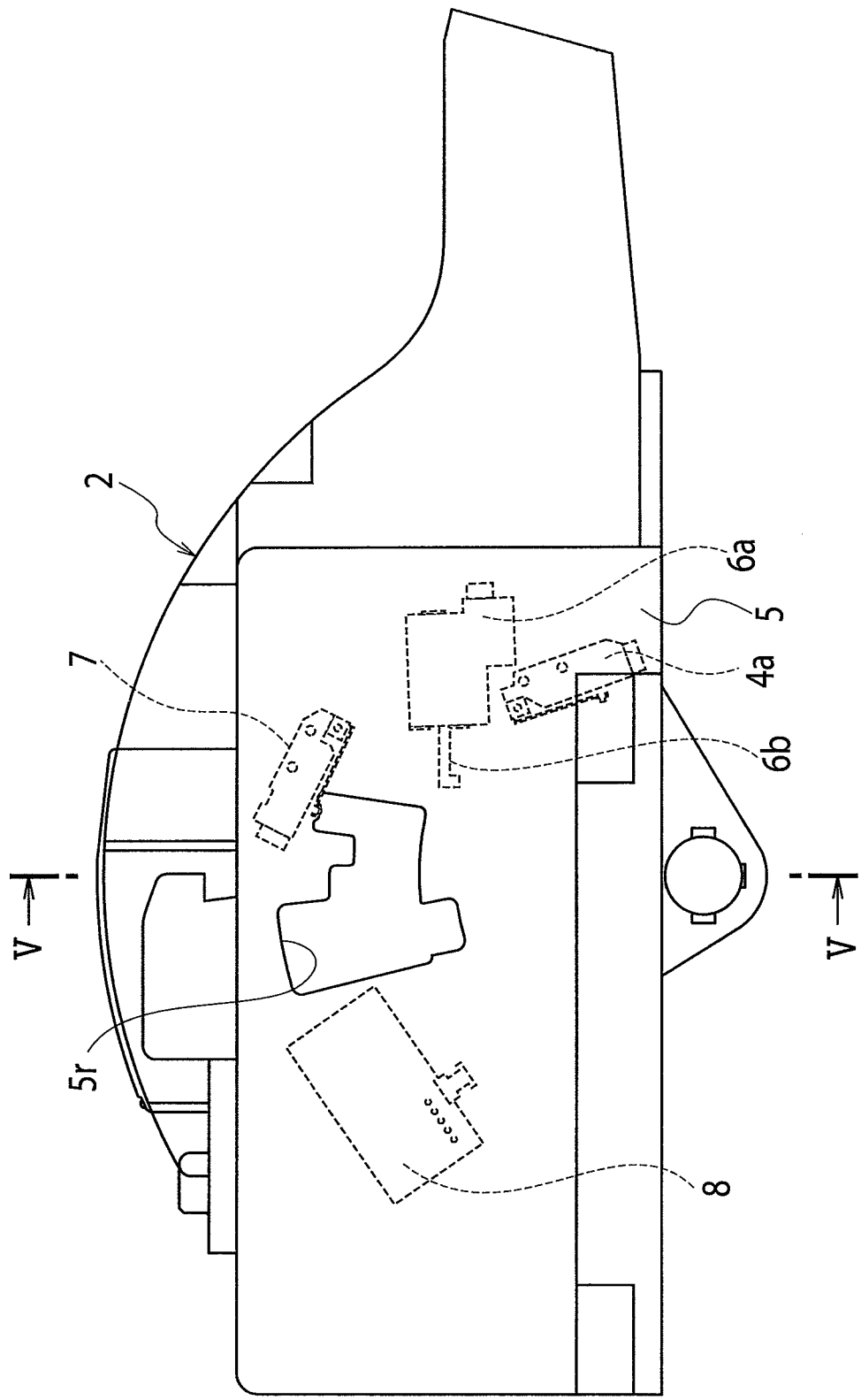
FIG. 4 is a side view of a body case according to the first embodiment of the present invention.
Figure 5:
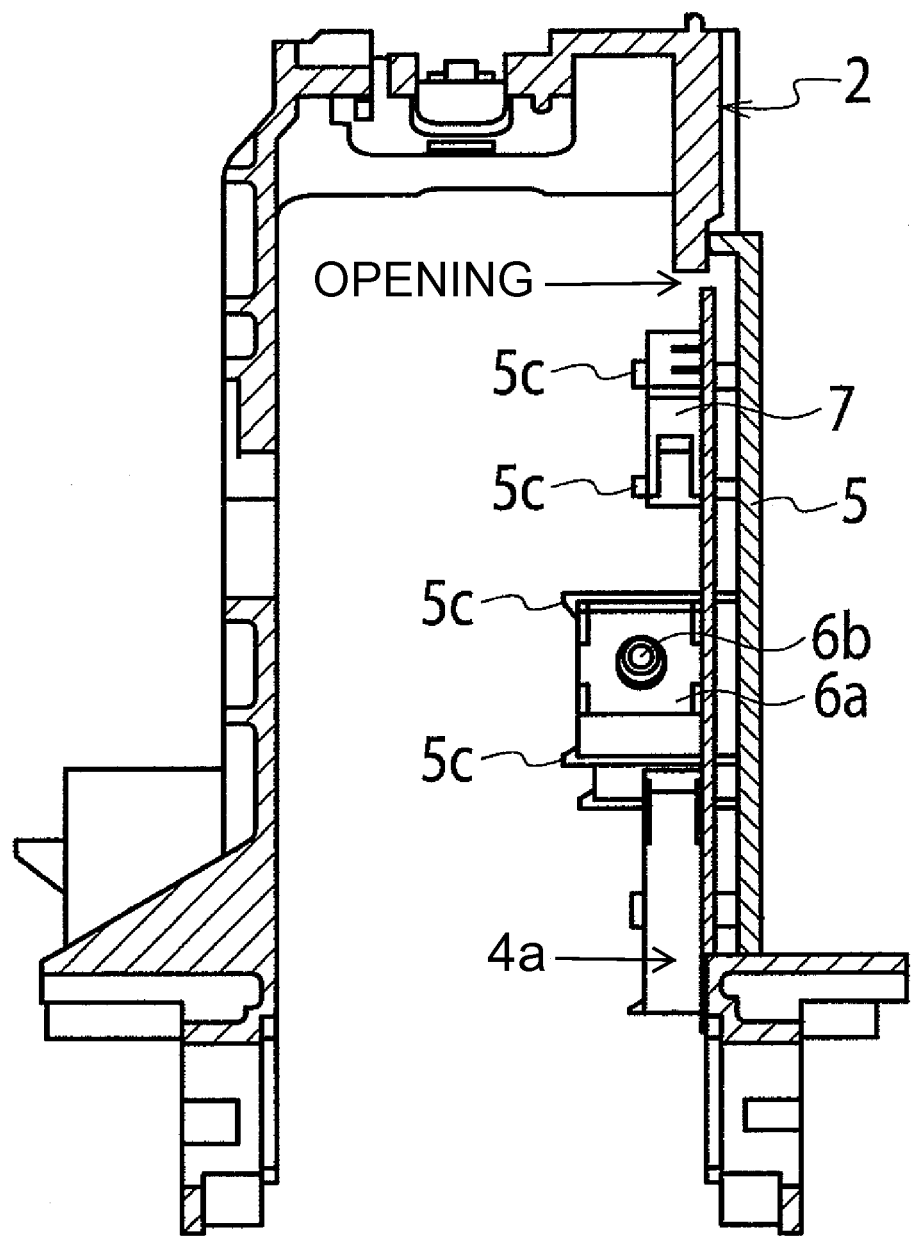
FIG. 5 is a cross-sectional view taken along the V-V line in FIG. 4.
Figure 6:
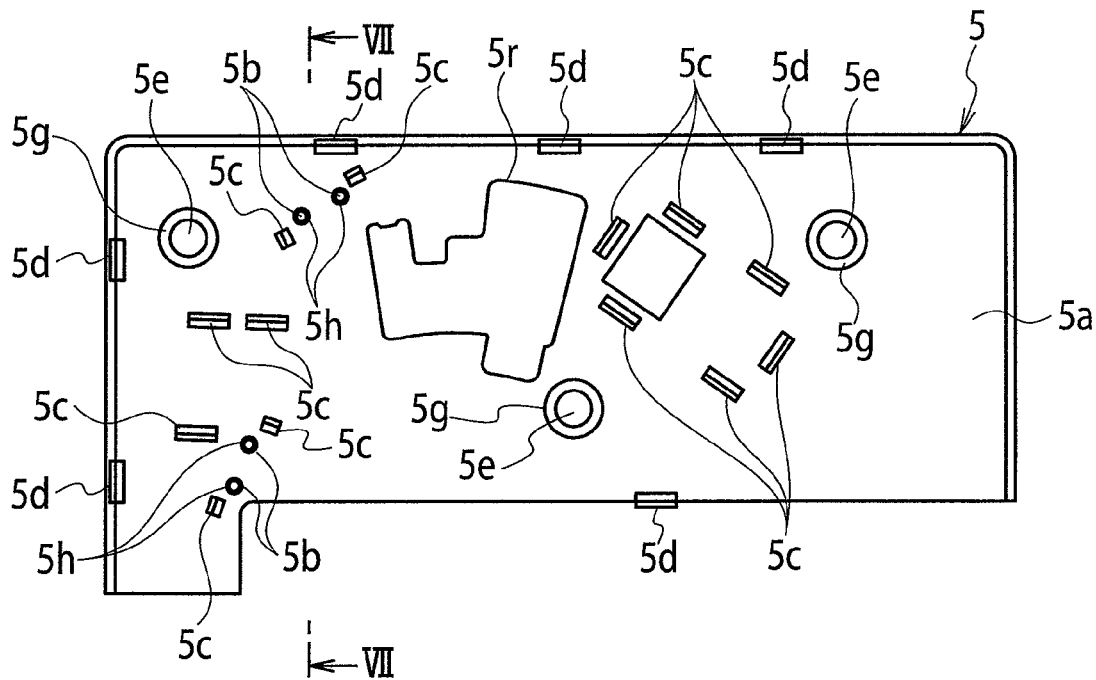
FIG. 6 is a plan view of a board cover according to the first embodiment of the present invention.
Figure 7:
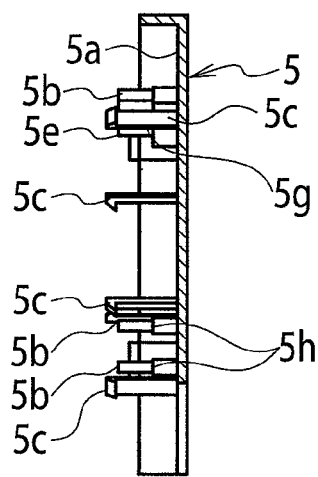
FIG. 7 is a cross-sectional view taken along the VII-VII line in FIG. 6.
Figure 8:
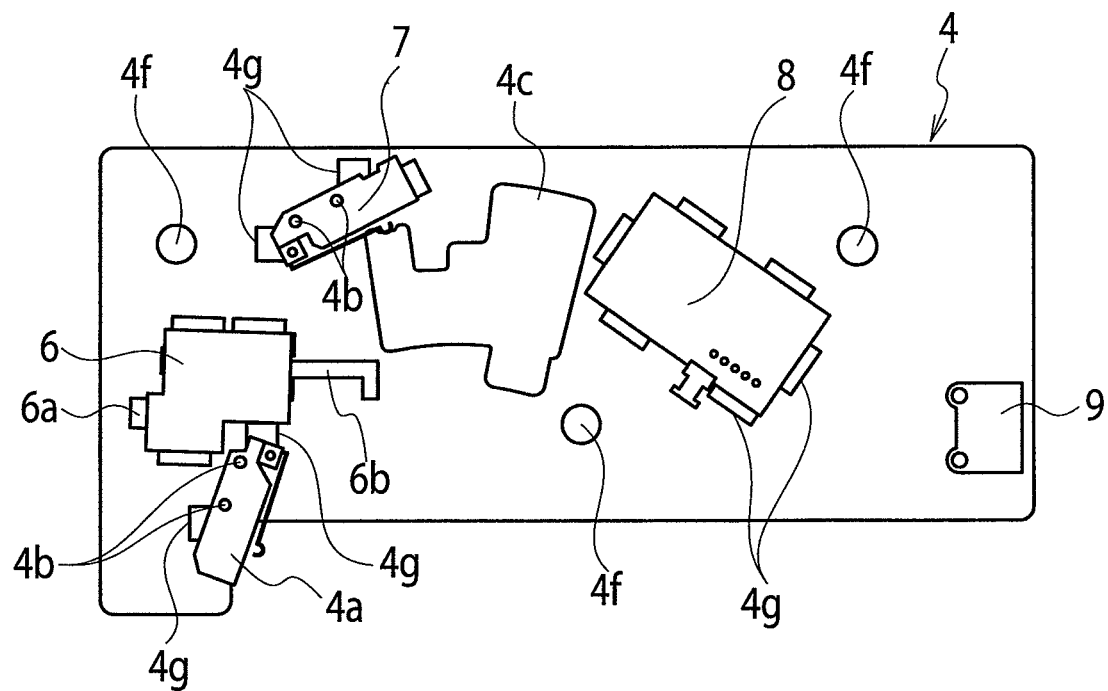
FIG. 8 is a plan view illustrating a mounting surface of a circuit board according to the first embodiment of the present invention.

Hereinafter, embodiments of the present invention will be described in detail with reference to the drawings.

First Embodiment

As illustrated in FIG. 3 to FIG. 10, a shift lever device 1 includes a shift lever 3 having a base end pivotally supported to a body case 2 swingably by a rotary shaft (not shown) and a shift lock mechanism (not shown) for performing a shift lock of the shift lever 3 in response to operation of a brake pedal of a vehicle (not shown). The body case 2 has a side wall 2a and a detent groove 2b formed in the side wall 2a. A position pin 3b is fit into the shift lever 3 and slides between a lock position where the position pin 3b is engaged with the detent groove 2b and an unlock position where the position pin 3b is detached from the detent groove 2b in response to operation of a knob button 3a disposed on the distal end of the shift lever 3. A circuit board 4 includes an electric component which electrically detects a position of the position pin 3b such as a P range position and is mounted to the body case 2 such that the circuit board 4 is interposed on the detent groove 2b. The circuit board 4 is covered with a board cover 5 from the outside.

The shift lever device 1 is configured to displace the shift lever 3 between positions set within a range of swing of the shift lever 3 to shift gears to a prescribed range corresponding to each of the positions. The shift lock mechanism is configured to enable the shift lever 3 not to be moved from the P range position improperly for a parked vehicle by enabling the shift lever 3 to be moved only when the brake pedal (not shown) is pressed.

The shift lock mechanism disposed in the body case 2 includes an electromagnetic solenoid 6a which is switched on in response to operation of the brake pedal (a solenoid operating portion) of the vehicle when the shift lever 3 is positioned in the P range position, a plunger 6b which is shifted by the electromagnetic solenoid 6a, and a lock member (not shown) which coordinates with the plunger 6b to shift between a lock position and an unlock position respectively for preventing and enabling movement of the position pin 3b positioned in the P range position of the detent groove 2b. The shift lock mechanism also includes a position switch 4a which detects the shift lever 3 being positioned in the P range position. The shift lock mechanism prevents movement of the shift lever 3 by preventing movement of the position pin 3b.

Figure 9:
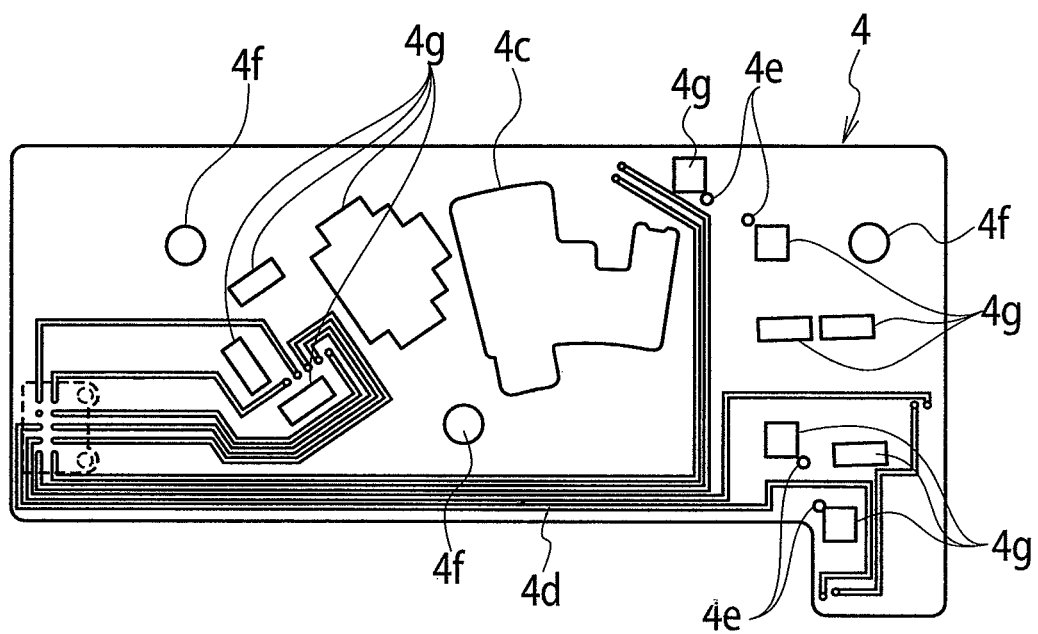
FIG. 9 is a plan view illustrating a wiring surface of the circuit board according to the first embodiment of the present invention.
Figure 10:
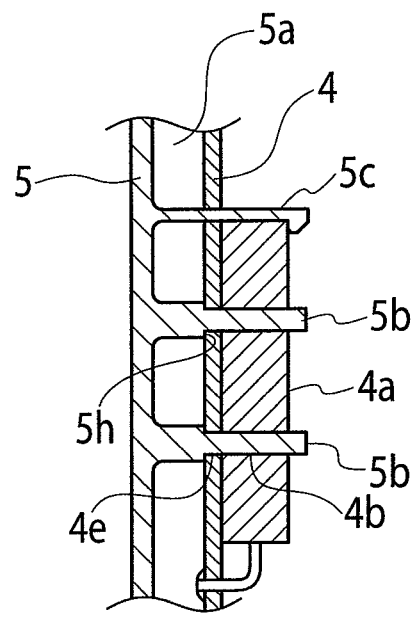
FIG. 10 is an enlarged view of the essential parts illustrating a state where the circuit board is mounted to the board cover according to the first embodiment of the present invention.
Figure 11:
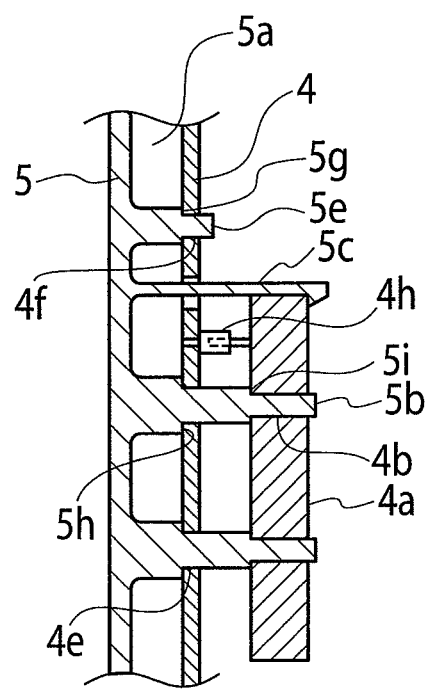
FIG. 11 is an enlarged view of the essential parts illustrating a state where a circuit board is mounted to a board cover according to a modification of the first embodiment of the present invention.
Figure 12:
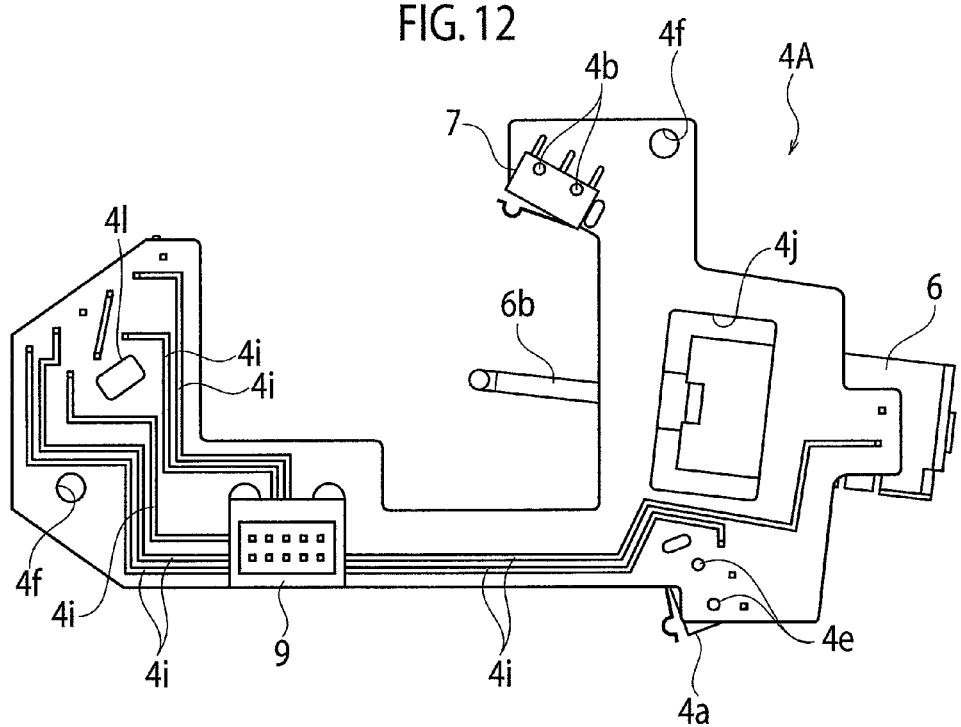
FIG. 12 is a plan view illustrating one surface of a circuit board according to a second embodiment of the present invention.
Figure 13:
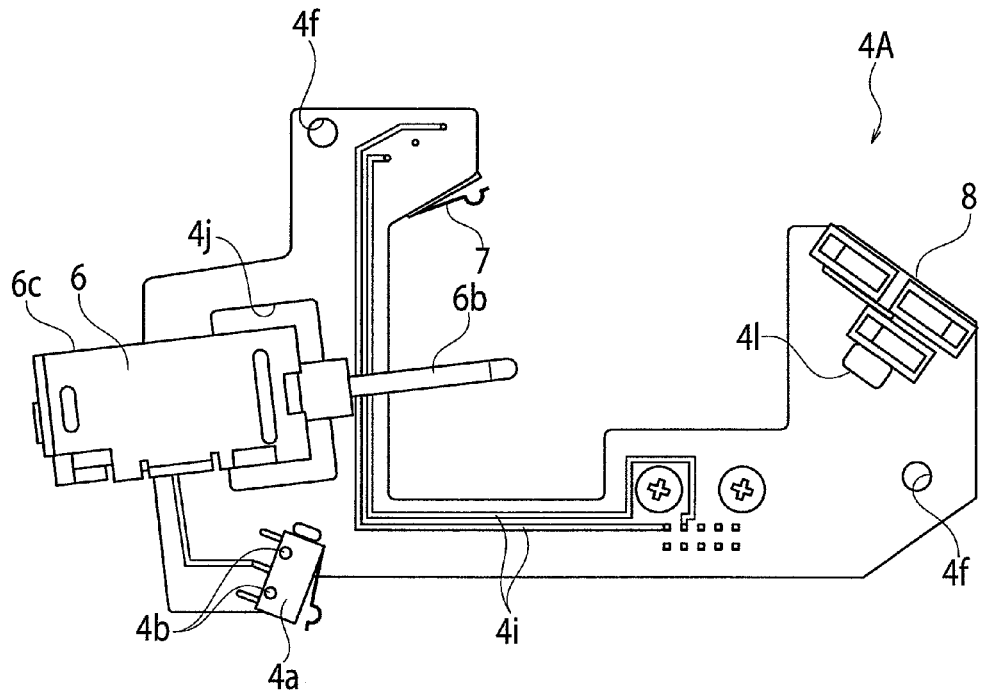
FIG. 13 is a plan view illustrating the other surface of the circuit board according to the second embodiment of the present invention.
Figure 14:
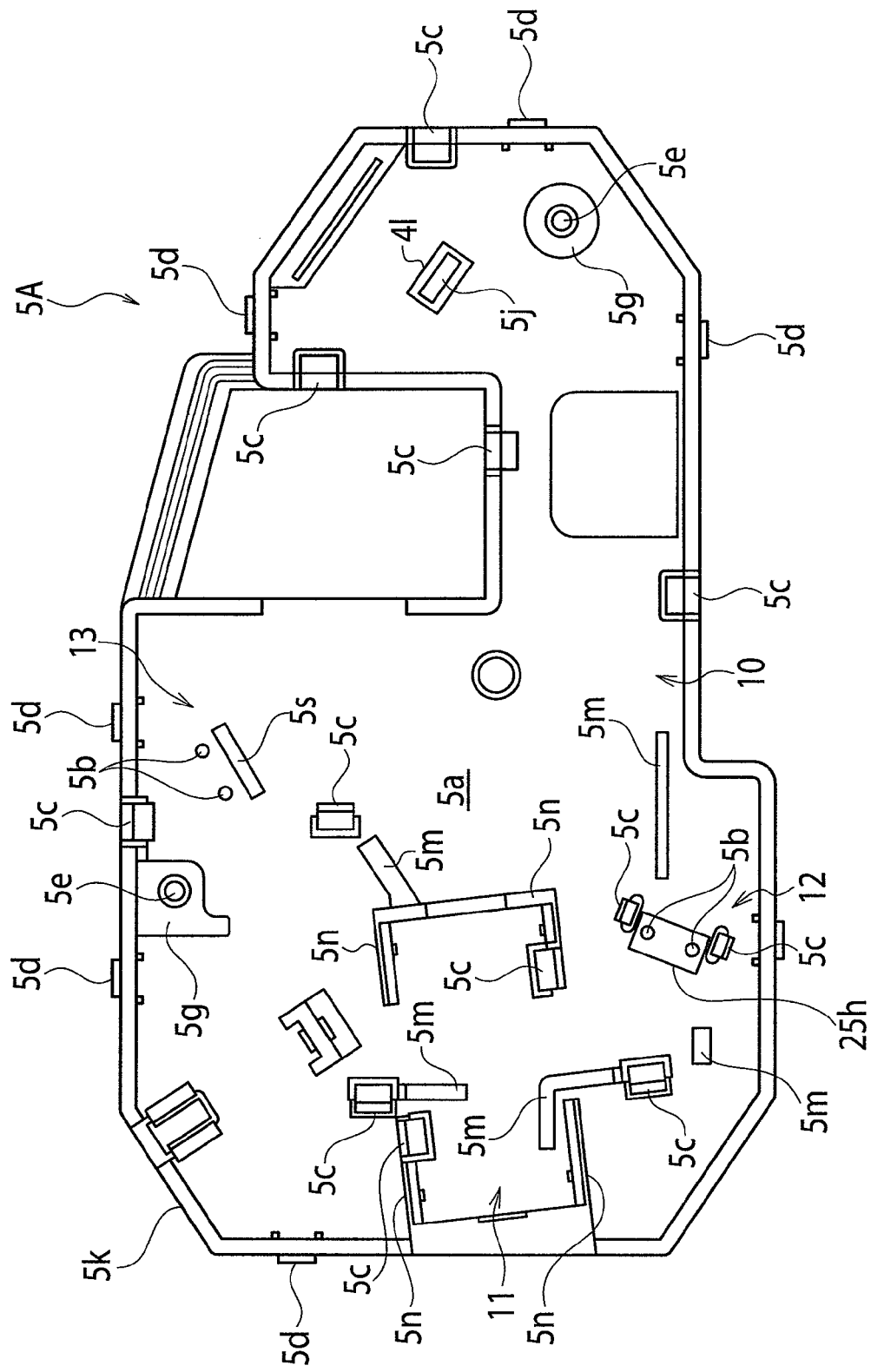
FIG. 14 is a plan view of a board cover according to the second embodiment of the present invention.
Figure 15:
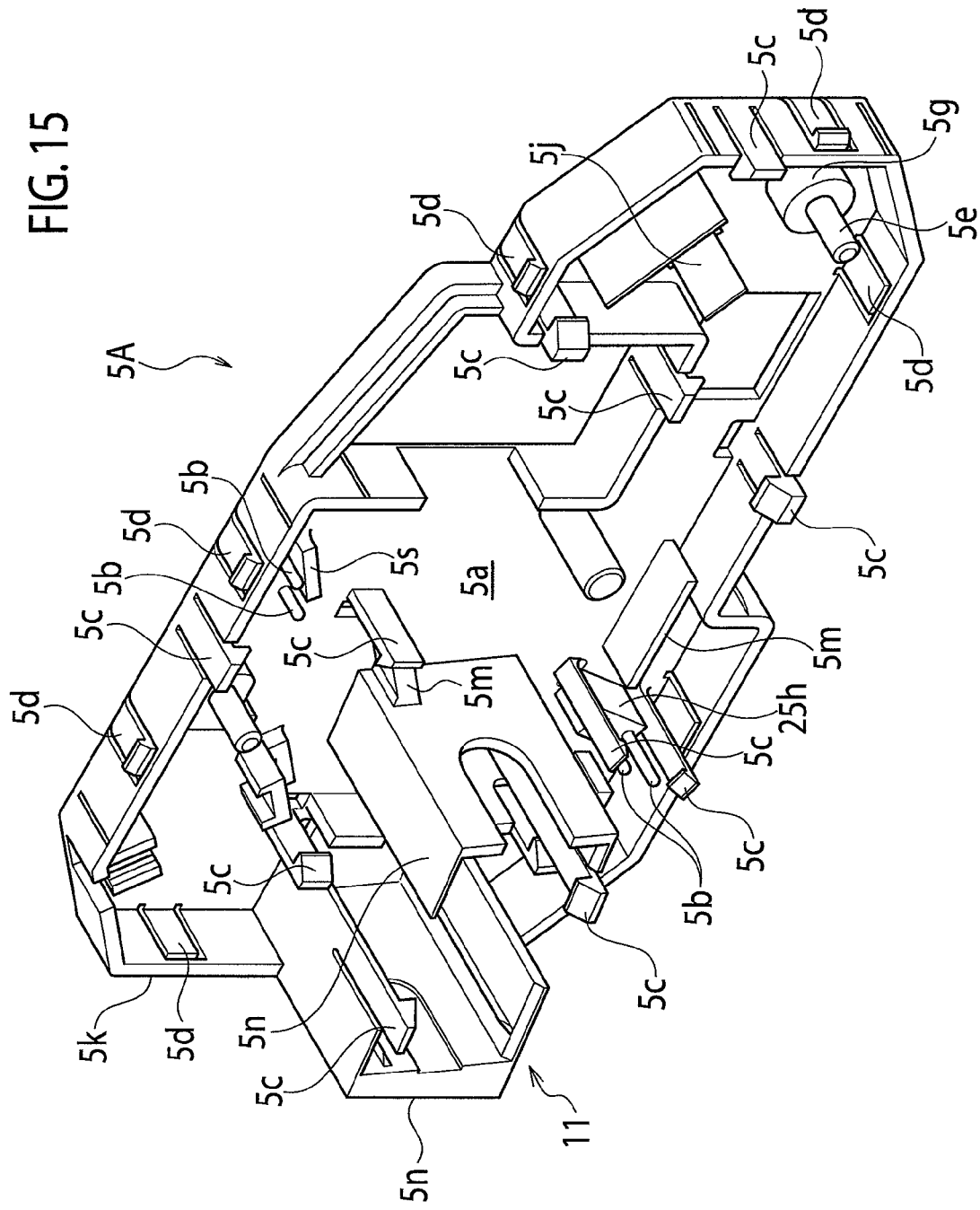
FIG. 15 is a perspective view illustrating a housing part side of the board cover according to the second embodiment of the present invention.
Figure 16:
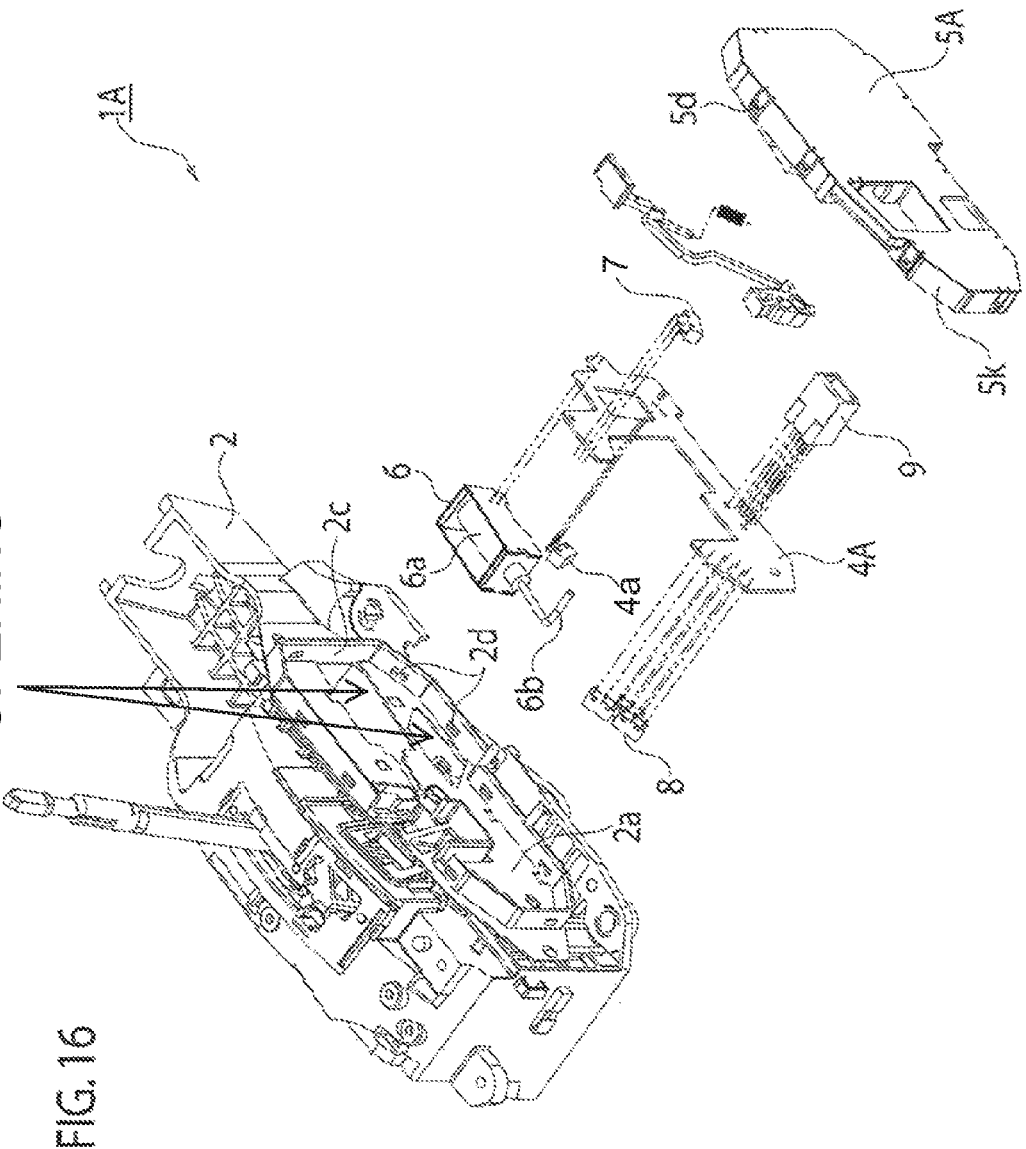
FIG. 16 is an exploded perspective view of a shift lever device according to the second embodiment of the present invention.
Figure 17:
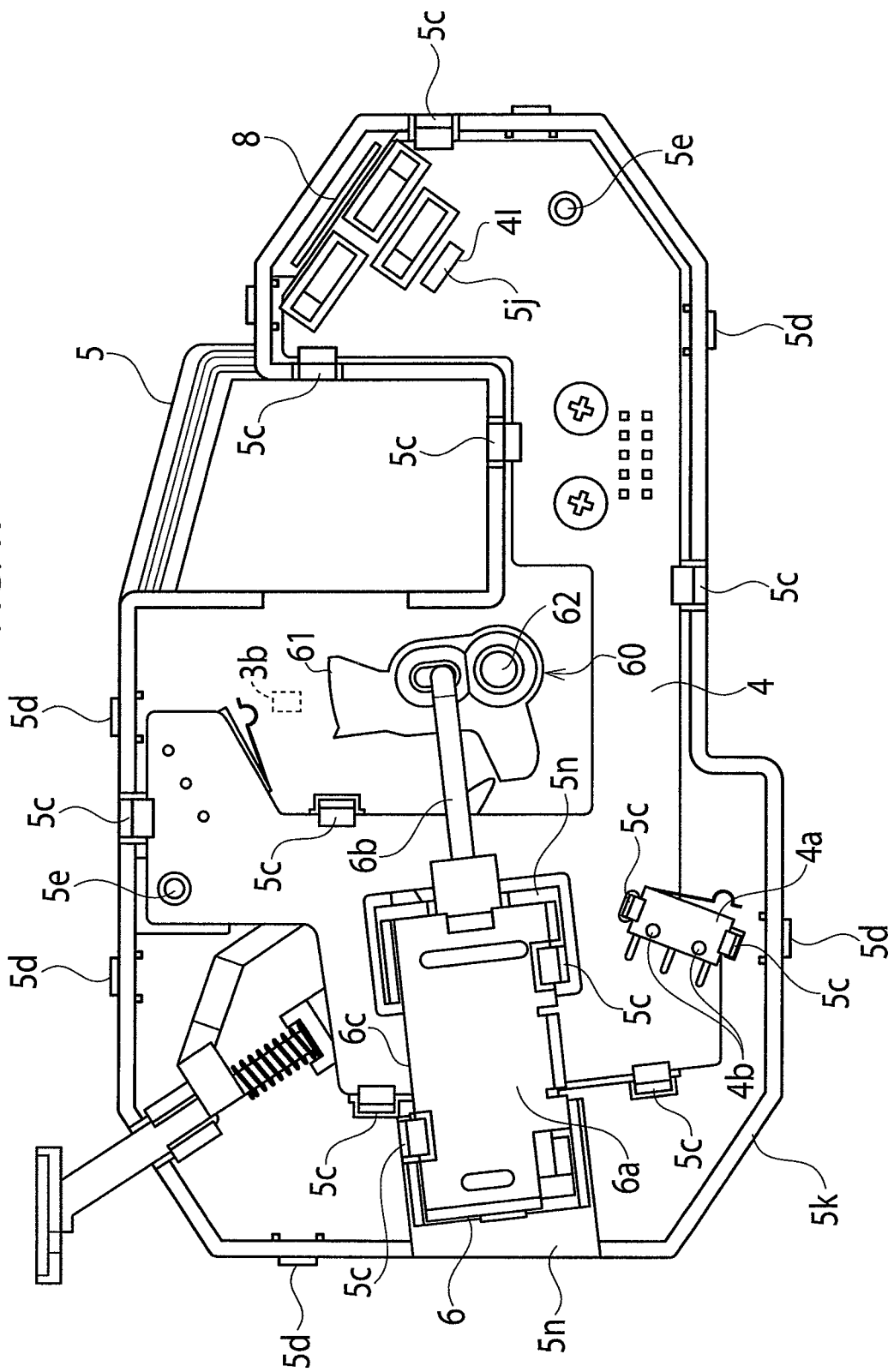
FIG. 17 is a plan view illustrating a state where the circuit board is mounted to the board cover according to the second embodiment of the present invention.
Figure 18:
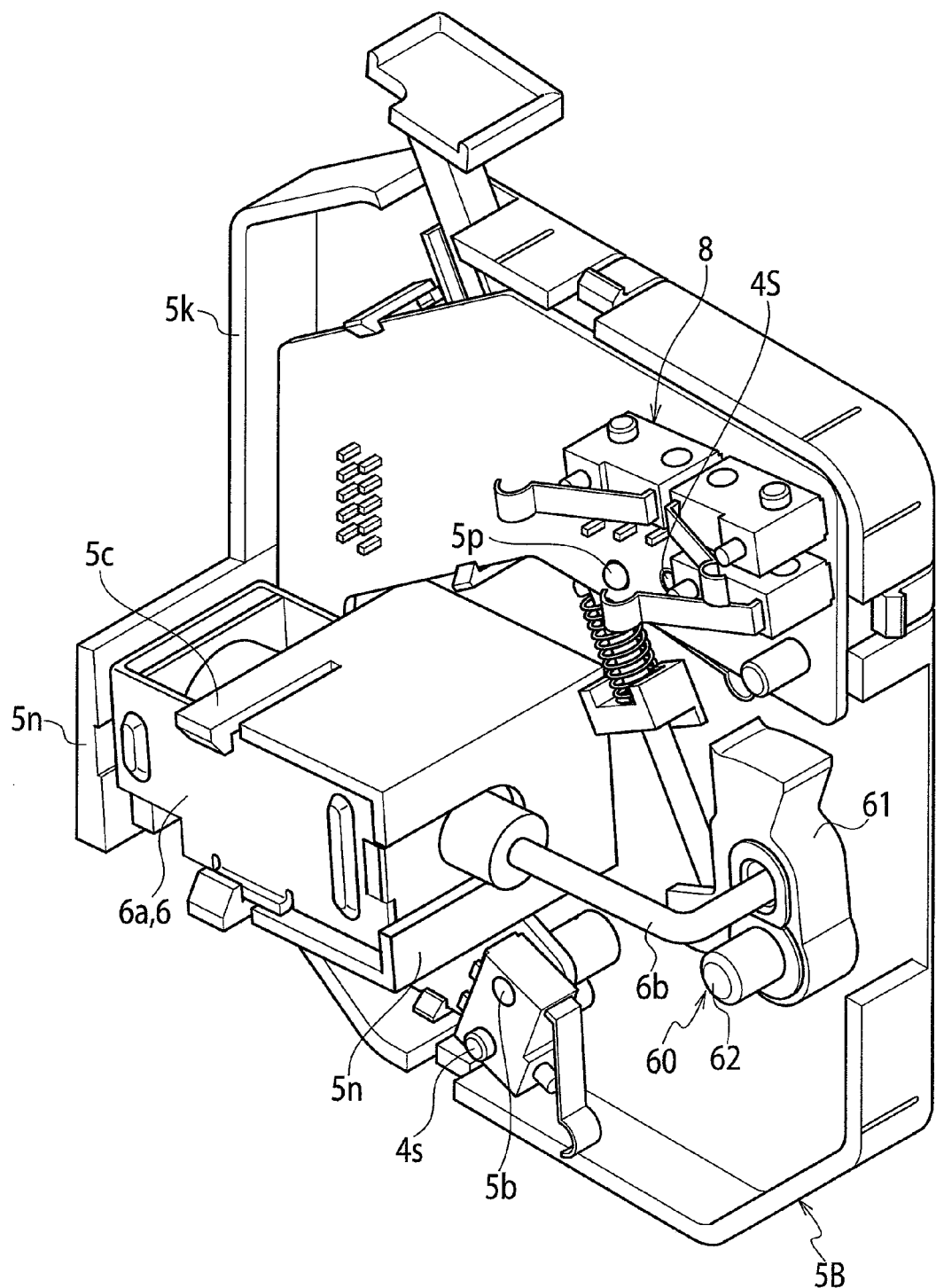
FIG. 18 is a perspective view illustrating a state where a circuit board is mounted to a board cover according to a third embodiment of the present invention.
Figure 19:
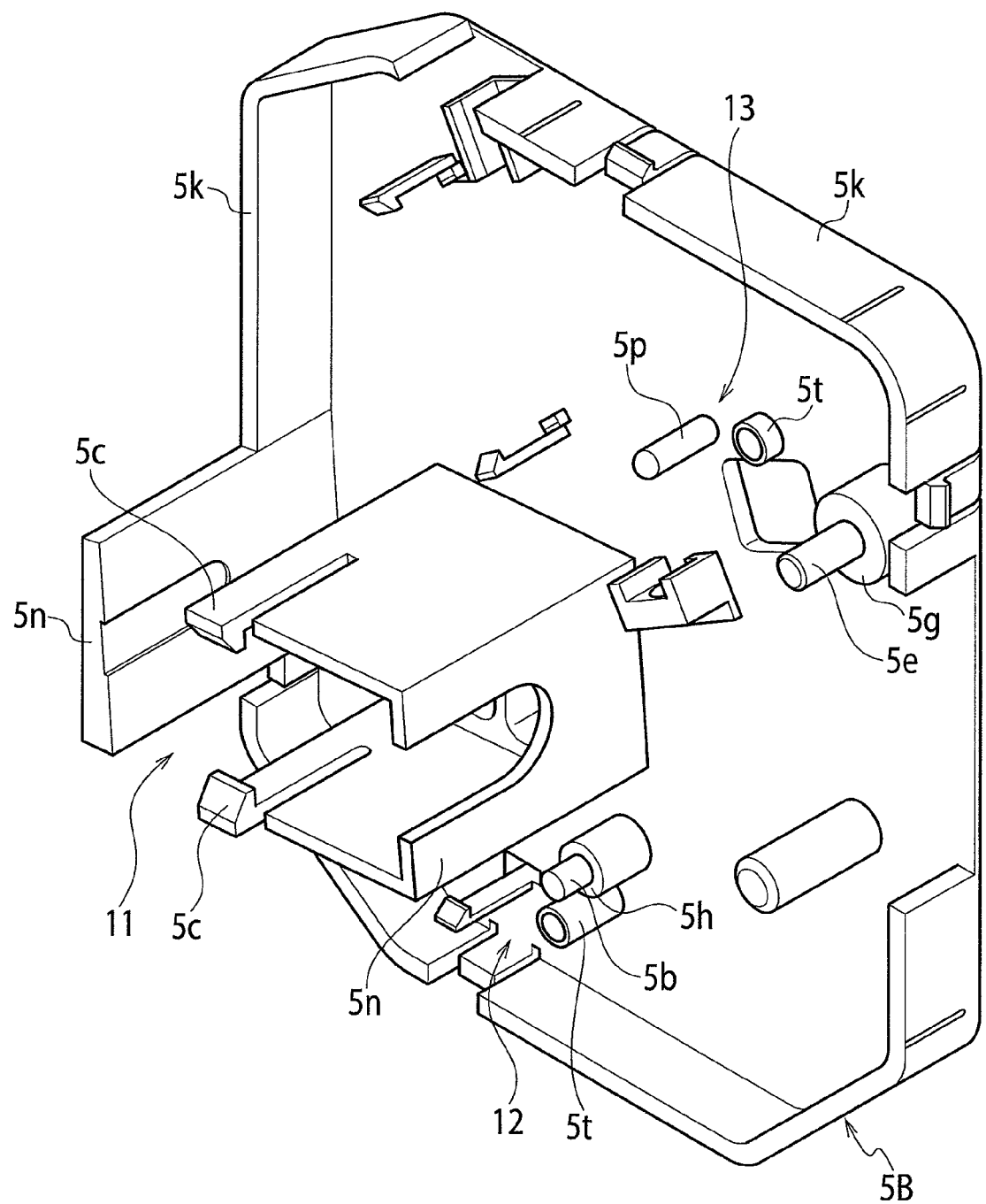
FIG. 19 is a perspective view illustrating a housing part side of the board cover according to the third embodiment of the present invention.
Figure 20:
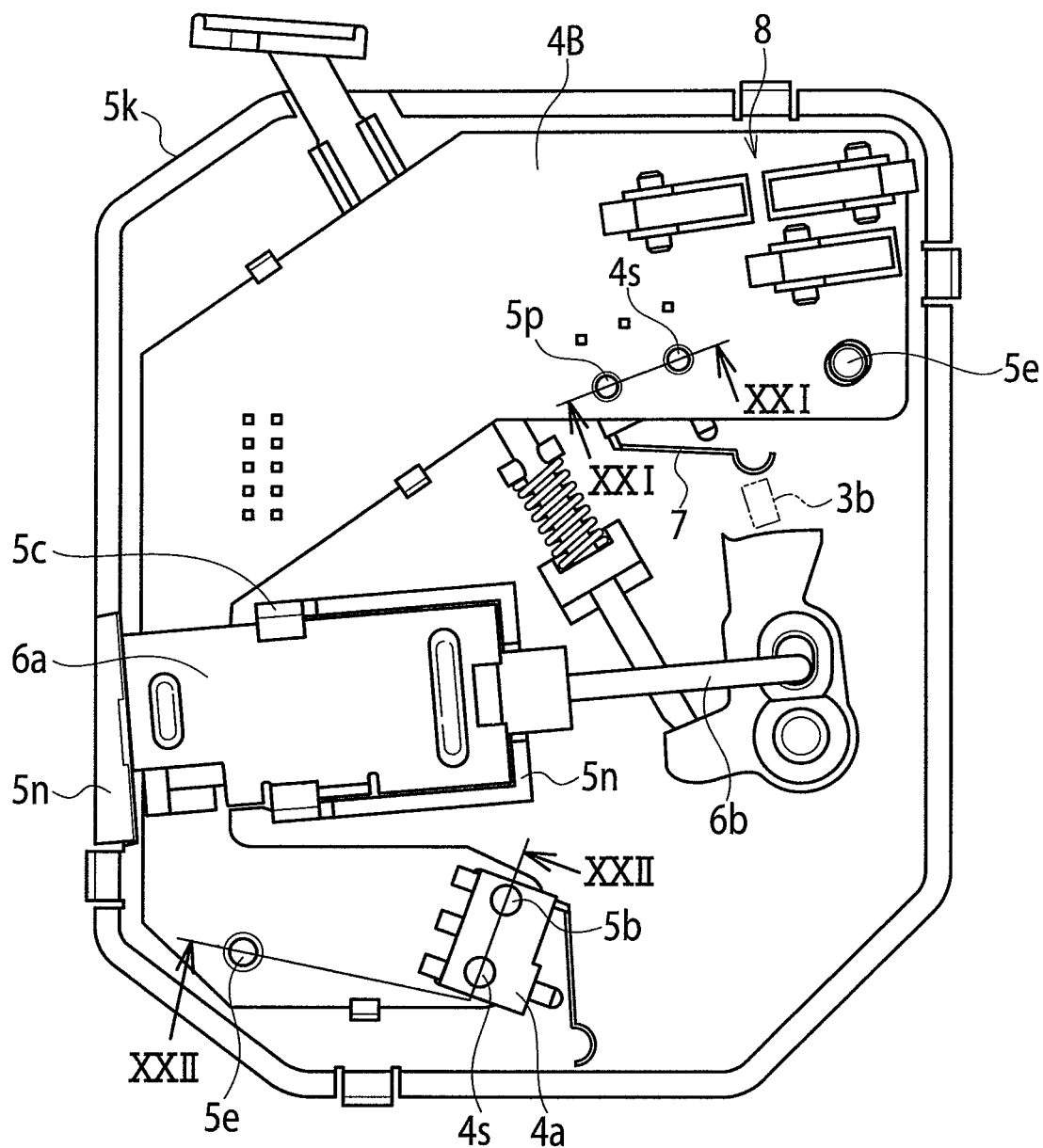
FIG. 20 is a plan view illustrating a state where the circuit board is mounted to the board cover according to the third embodiment of the present invention.

The circuit board 4 has a mounting surface on one surface on which various electric components and circuit components are mounted, and a wiring surface on the other surface on which wirings 4d are wired as illustrated in FIG. 9. The position switch (as an electric component) 4a is disposed on the mounting surface of the circuit board 4 along with the electromagnetic solenoid 6a and other circuit components. Those components have terminals electrically connected to the corresponding wirings 4d on the wiring surface through the circuit board 4. The position switch 4a has two through holes (receiver portions) 4b penetrating through the position switch 4a in a through-thickness direction of the circuit board 4. The circuit board 4 has insertion holes 4e in positions corresponding to the through holes 4b and has through holes 4f into which second stepped shaft protrusions 5e defining a board supporting part to be described are inserted. The circuit board 4 also has a groove 4c having the same shape as the detent groove 2b of the body case 2.

In the present embodiment, an integrated connector 9 is disposed on the circuit board 4, and each of the electric components and the single integrated connector 9 are electrically connected to each other via the wirings 4d formed on the circuit board 4 instead of via harnesses.

The board cover 5 has a concave housing part 5a which is defined in the board cover 5 by a flange 5f formed on the peripheral portion of the board cover 5. The housing part 5a is provided with first stepped shaft protrusions (support portions) 5b which are protrudingly formed in shaft shape and are tightly inserted and disposed in the respective through holes 4b and insertion holes 4e, and the second stepped shaft protrusions 5e which are inserted into the through holes 4f. The first stepped shaft protrusions 5b define an electric component supporting part and the second stepped shaft protrusions 5e define the board supporting part. The shaft diameter in the shaft shape of the respective first stepped shaft protrusions 5b is formed thinner in two steps with steps from the base end toward the distal end of the respective first stepped shaft protrusions 5b by a stepped portion 5h. The shaft diameter in the shaft shape of the respective second stepped shaft protrusions 5e is also formed thinner with steps from the base end toward the distal end of the respective second stepped shaft protrusions 5e by a stepped portion 5g. The housing part 5a is provided with engaging claws 5c which maintain the circuit board 4 inside the housing part 5a by penetrating through holes 4g formed in the circuit board 4 and engaging with the peripheral portion of the position switch 4a in a state where both the circuit board 4 and the position switch 4a are housed in the housing part 5a in this order. The engaging claws 5c define the electric component supporting part. The flange 5f of the board cover 5 is provided with fixing claws 5d formed so as to engage with the body case 2. A first electric component supporting part 11 is defined in the solenoid 6, a second electric component supporting part 12 is defined in the position switch 4a, and a third electric component supporting part 13 is defined in a key switch 7.

With the above arrangement, the circuit board 4 is first mounted to the board cover 5 for mounting the circuit board 4 to the body case 2. At this time, the stepped portions 5g of the second stepped shaft protrusions 5e position the circuit board 4 with respect to the board cover 5. Then the first stepped shaft protrusions 5b penetrating through the insertion holes 4e of the circuit board 4 to protrude from the circuit board 4 are inserted into the through holes 4b of the position switch 4a, and the engaging claws 5c penetrating through the through holes 4g are engaged with the position switch 4a. By these operations, the engaging claws 5c and the stepped portions 5h of the first stepped shaft protrusions 5b position the position switch 4a with respect to the circuit board 4 and the board cover 5. Similarly, as electric components, the solenoid 6, and the key switch 7 and a manual mode switch 8 which cooperate with an electronic key are also mounted to the circuit board 4. The solenoid 6 and the manual mode switch 8 are mounted to the circuit board 4 with the engaging claws 5c penetrating through the through holes 4g, and key switch 7 is mounted to the circuit board 4 with the first stepped shaft protrusions 5b penetrating through the through holes 4b, 4b and the engaging claws 5c penetrating through the through holes 4g. The board cover 5 has a groove 5r having the same shape as the detent groove 2b of the body case 2, like the circuit board 4.

Next, the fixing claws 5d of the board cover 5 with the circuit board 4 housed therein are engaged with the body case 2 and the circuit board 4 is mounted to the body case 2 such that the circuit board 4 is interposed between the board cover 5 and the body case 2.

According to this embodiment, the circuit board 4 is mounted to the body case 2 via the board cover 5 in a state where the circuit board 4 is housed in the housing part 5a which includes the first stepped shaft protrusions 5b, and thus the first stepped shaft protrusions 5b and/or the engaging claws 5c receive a load being imposed on the position switch 4a or the key switch 7 due to operation of the shift lever 3 or the like. Therefore, the load is not imposed on the circuit board 4 and thus it is possible to protect the circuit board 4 from the load being imposed on the position switch 4a or the key switch 7 without taking countermeasures such as increase in the strength of the fixation of the position switch 4a or the key switch 7 and without degrading assembly workability.

The receiver portions are the through holes 4b formed in the position switch 4a or the key switch 7 and the support portions are the first stepped shaft protrusions 5b tightly disposed in the through holes 4b, and thus positioning of the position switch 4a or the key switch 7 and imposition of a load can be achieved through the board cover 5. For this reason, it is possible to improve accuracy of positioning and prevent the occurrence of a bad connection in connection parts of the position switch 4a or the key switch 7 and the circuit board 4 because displacement between the position switch 4a or the key switch 7 and the circuit board 4 is prevented when a load is imposed on the position switch 4a or the key switch 7. It is also possible to enable the support portions to receive a load being imposed on the position switch 4a or the key switch 7 without precisely setting the shape of the support portions for a direction of the load being imposed on the position switch 4a or the key switch 7.

The circuit board 4 is maintained in the housing part 5a by engagement of the engaging claws 5c with the above-mentioned electric components such as the position switch 4a. Consequently, it is possible to simplify an assembly work.

It is possible to perform positioning between the electric components (such as switches) mounted to the circuit board 4 and the shift lever 3 by fitting the second stepped shaft protrusions 5e into fitting holes (not shown) formed in the body case 2 after positioning the circuit board 4 with the stepped portions 5g of the second stepped shaft protrusions 5e formed on the board cover 5. The height of the stepped portion 5g of the respective second stepped shaft protrusions 5e above the board cover 5 is the same as that of the stepped portion 5h of the respective first stepped shaft protrusions 5b. These stepped portions 5g and 5h position the circuit board 4 with respect to the board cover 5.

Although the terminals of the electric components penetrate from the mounting surface to the wiring surface to electrically connect to the corresponding wirings 4d in this embodiment, the terminals may be inserted and fit into corresponding sockets 4h provided on the mounting surface of the circuit board 4 for electrical connection. In this case, two stepped portions 5h and 5i are formed on the respective first stepped shaft protrusions 5b. The stepped portions 5h are for positioning of the circuit board 4 and the stepped portions 5i are for positioning of the electric components.

Although the board cover 5 is engaged with the body case 2 in a state where both the circuit board 4 and the electric components are housed in the housing part 5a in this order in this embodiment, the board cover 5 may be engaged with the body case 2 in a state where both the electric components and the circuit board 4 are housed in the housing part 5a in this order. Also in this case, the same effects and advantages can be achieved.

Although the through holes 4b are provided to the position switch 4a as an electric component and are supported by the first stepped shaft protrusions 5b of the housing part 5a in this embodiment, receiver portions may be provided to the electromagnetic solenoid 6 or the like in addition to the position switch 4a and be supported by support portions provided to the housing part 5a.

Although the support portions are provided to protrude from the housing part 5a of the board cover 5 and the board cover 5 receives a load being imposed on the electric components in this embodiment, the support portions may be provided to protrude from the body case 2 and the body case 2 may receive a load being imposed on the electric components. Also in this case, the same effects and advantages can be achieved, and it is possible to improve accuracy of positioning of the electric components without degrading assembly workability because the electric components are positioned by the support portions of the body case 2.

The integrated connector 9 is disposed on the circuit board 4 and this single integrated connector 9 and the electric components are electrically connected to each other via the wirings 4d formed on the circuit board 4 instead of harnesses. Therefore, steps of wiring harnesses for each of the electrical components and connecting the harnesses to each of the electrical components can be saved, thereby improving assembly workability.

Second Embodiment

FIG. 12 to FIG. 17 illustrate a shift lever device 1A according to a second embodiment of the present invention. The shift lever device 1A according to the second embodiment is different from the first embodiment mainly in the configuration of a circuit board 4A to be mounted to a board cover 5A. The configuration for mounting the circuit board 4A to the board cover 5A is the same as the first embodiment. In the second embodiment, the same constituents as those in the first embodiment are designated with the same reference numerals and duplicate description will be omitted herein.

The circuit board 4A has one surface and the other surface both for mounting electric components and circuit components and wiring irrespective of a mounting surface and a wiring surface in the second embodiment, while the circuit board 4 has one surface as the mounting surface only for mounting electric components and circuit components, and the other surface as the wiring surface only for wiring in the first embodiment.

In this embodiment, the integrated connector 9 is disposed on the circuit board 4A, and this single integrated connector 9 and each of the electric components are electrically connected to each other via printed wirings 4i formed on the circuit board 4A instead of via harnesses.

An operation force is imposed on the position switch 4a and the key switch 7 defining electric components in a direction along a board surface of the circuit board 4A. However, the first stepped shaft protrusions 5b (support portions) are inserted into the through holes 4b to support the through holes 4b. Therefore, the operation force is imposed on the board cover 5A via the first stepped shaft protrusions 5b while the operation force is not imposed on the circuit board 4A. The first stepped shaft protrusions 5b position the position switch 4a and the key switch 7 with respect to the board cover 5A.

The manual mode switch 8 defining an electric component includes three on-off switches. The board cover 5A is provided with a stopper protrusion 5j to be inserted into a through hole 4l formed in the circuit board 4A. An operation force is imposed on the manual mode switch 8 in a direction where the manual mode switch 8 is pressed to the board surface of the circuit board 4A. However, the board surface of the circuit board 4A is supported by the stopper protrusion 5j protruding from the board cover 5A. Therefore, the operation force is imposed on the board cover 5A via the stopper protrusion 5j while the operation force is not imposed on the circuit board 4A.

The board cover 5A is provided with the fixing claws 5d on a peripheral wall 5k to engage with the side wall 2a of the body case 2 for maintaining the board cover 5A in the body case 2. A flanged receiver portion 2c into which the peripheral wall 5k of the board cover 5A is fit is integrally formed on the side wall 2a. The receiver portion 2c has engaging holes 2d with which the fixing claws 5d are engaged. The housing part 5a of the board cover 5A is provided with a board supporting part 10, and the first electric component supporting part 11, the second electric component supporting part 12, and the third electric component supporting part 13 as electric component supporting part s.

The board supporting part 10 consists of the engaging claws 5c, flanges 5m, and the second stepped shaft protrusions 5e. The engaging claws 5c are provided to protrude from the housing part 5a and include hook-like portions to be engaged with the circuit board 4A on their distal ends. The flanges 5m and the stepped portions 5g of the second stepped shaft protrusions 5e have the same protruding dimension above the inside surface of the board cover 5a and the circuit board 4A is securely mounted between the hook-like portions of the engaging claws 5c, and the flanges 5m and the stepped portions 5g. The distal ends of the engaging claws 5c are engaged with the circuit board 4A as positioned and disposed on the flanges 5m and the stepped portions 5g to house the circuit board 4A in the housing part 5a.

The first electric component supporting part 11 (the electric component supporting part) consists of flange walls 5n (support portions) and the engaging claws 5c. The flange walls 5n penetrate through an opening 4j of the circuit board 4A and surround side walls 6c (receiver portions) of the solenoid 6 on the circuit board 4A to position the solenoid 6 with respect to the board cover 5A. The engaging claws 5c avoid the circuit board 4A while engaging with the solenoid 6 on the circuit board 4A. Then the solenoid 6 is positioned on the circuit board 4A by the flange walls 5n and housed in the housing part 5a under engagement with the engaging claws 5c.

The second electric component supporting part 12 (the electric component supporting part) consists of the first stepped shaft protrusions 5b (support portions) and the engaging claws 5c. The first stepped shaft protrusions 5b formed on a protrusion 25h penetrate through the insertion holes 4e of the circuit board 4A and are tightly inserted into the through holes 4b (receiver portions) of the position switch 4a to position the position switch 4a with respect to the board cover 5A and receive the load being imposed on the position switch 4a.

The third electric component supporting part 13 (the electric component supporting part) consists of a flange 5s and the first stepped shaft protrusions 5b (support portions). The flange 5s abuts on and supports the key switch 7 on the circuit board 4A, and the first stepped shaft protrusions 5b are tightly inserted into the through holes 4b (receiver portions) of the position switch 4a, to position the position switch 4a with respect to the board cover 5A and receive the load being imposed on the position switch 4a.

A shift lock mechanism 60 includes the solenoid 6 and a lock lever 61. The lock lever 61 is rotatably provided to an axis 62 protruding from the board cover 5A. The lock lever 61 is configured to prevent the position pin in the P range position from being moved to the other range position. The lock lever 61 is configured with the solenoid 6 to be movable between a lock position where the lock lever 61 is positioned on a movement locus of the position pin 3b (below the position pin 3b in FIG. 17) and an unlock position where the lock lever 61 is positioned out of the movement locus of the position pin 3b.

With the above-mentioned configurations where the integrated connector 9 is disposed on the circuit board 4A and this single integrated connector 9 and the electric components are electrically connected to each other via printed wirings 4i formed on the circuit board 4A instead of via harnesses, steps of wiring harnesses for each of the electrical components and connecting the harnesses to each of the electrical components can be saved, thereby improving assembly workability.

With the above-mentioned configurations, even in the configuration where the electric components are connected to the circuit board 4A by soldering or the like, the electric components supported by the board cover 5A can prevent the load from being applied to the circuit board 4A. Therefore, it is possible to prevent the occurrence of problems such as a bad connection and to improve both assembly accuracy and assembly workability.

Third Embodiment

FIG. 18 to FIG. 22 illustrate a shift lever device according to a third embodiment of the present invention. The shift lever device according to the third embodiment is different from the first embodiment mainly in the position of the manual mode switch 8 on a circuit board 4B and in the means for fixing the position switch 4a and the key switch 7 to a board cover 5B as the electric component supporting part. The configuration for mounting the circuit board 4B to the board cover 5B is the same as the first embodiment. In the third embodiment, the same constituents as those in the first embodiment are designated with the same reference numerals and duplicate description will be omitted herein.

The manual mode switch 8, as similar to the second embodiment, includes three on-off switches and is disposed on the circuit board 4B close to the key switch 7 which detects the shift lever 3 positioned in the parking position. In a state where the circuit board 4B is disposed with its board surface along an anteroposterior direction of the vehicle, the manual mode switch 8 is positioned in the front side of the vehicle on the circuit board 4B. Therefore, the electric components are concentrated in the vicinity of the key switch 7 on the circuit board 4B, thereby downsizing both the circuit board 4B and the board cover 5B.

Figure 21:
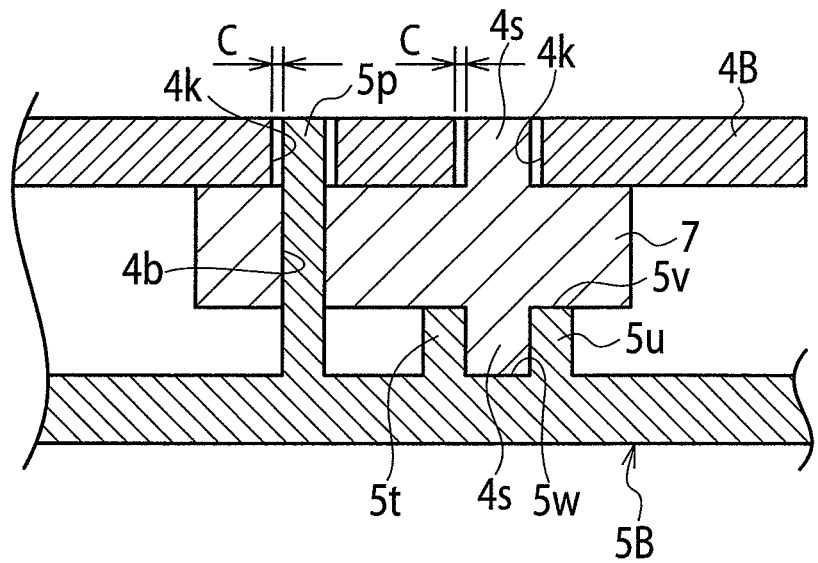
FIG. 21 is a cross-sectional view taken along the XXI-XXI line in FIG. 20.

The through hole 4b is formed in the key switch 7 as the electric component supporting part as illustrated in FIG. 21. Fitting protrusions 4s, 4s protrude from both sides of the key switch 7 parallel to the through hole 4b. Terminals of the key switch 7 are electrically connected to the corresponding printed wirings formed on the circuit board 4B. One of the fitting protrusions 4s, 4s of the key switch 7 is inserted into one of insertion holes 4k formed in the circuit board 4B to fix the key switch 7 on the circuit board 4B.

Two of the insertion holes 4k defining the electric component supporting part are formed in the circuit board 4B at the locations facing the through hole 4b of the key switch 7 and the one of the fitting protrusions 4s. The diameter of the respective insertion holes 4k is greater than that of the corresponding fitting protrusion 4s and shaft protrusion 5p to be described.

The shaft protrusion 5p protruding into inside the housing part 5a and a cylindrical shaft 5t both defining the electric component supporting part are disposed close to each other on the board cover 5B. The cylindrical shaft 5t has a cylindrical wall and the other one of the fitting protrusions 4s of the key switch 7 is tightly fit into the cylindrical wall. The shaft protrusion 5p has no steps and has the radial portions of a constant shaft shape. The diameter of the shaft protrusion 5p is set such that the shaft protrusion 5p is tightly inserted into the through holes 4b when the circuit board 4B is mounted to the board cover 5B. The shaft protrusion 5p is inserted into one of the two insertion holes 4k.

Clearance C is left respectively between the shaft protrusion 5p and the corresponding insertion hole 4k and between the one of the fitting protrusions 4s and the corresponding insertion hole 4k in a state where the circuit board 4B is mounted to the board cover 5B.

Figure 22:
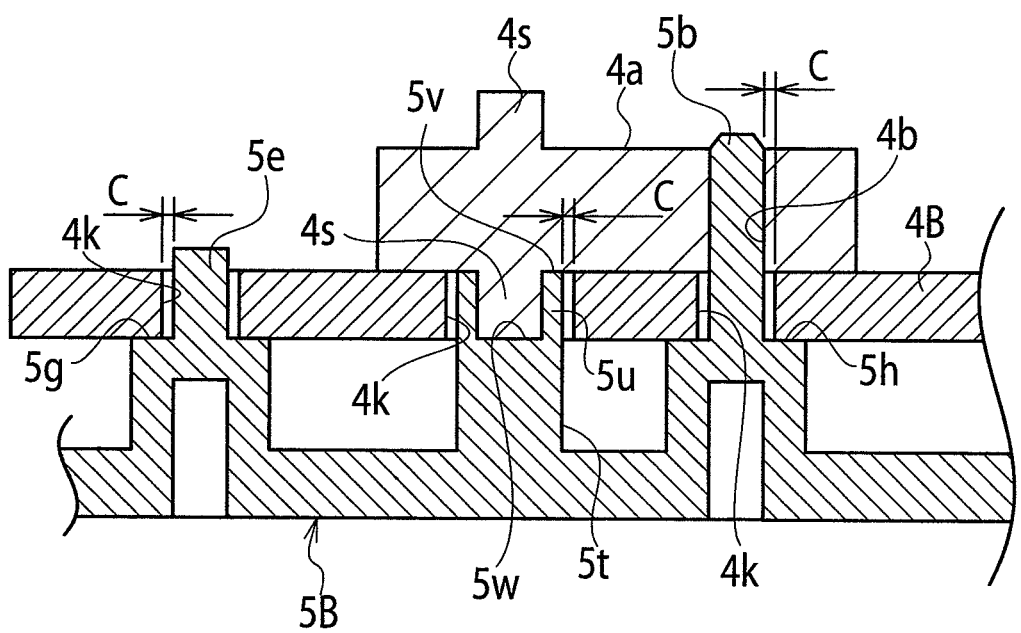
FIG. 22 is a cross-sectional view taken along the XXII-XXII line in FIG. 20.

The through hole 4b is also formed in the position switch 4a and the fitting protrusions 4s, 4s also protrude from both sides of the position switch 4a parallel to the through hole 4b of the position switch 4a, as illustrated in FIG. 22. Terminals of the position switch 4a are electrically connected to the corresponding printed wirings formed on the circuit board 4B. One of the fitting protrusions 4s, 4s of the position switch 4a is inserted into one of the insertion holes 4k formed in the circuit board 4B and is tightly fit into another cylindrical shaft 5t to fix the position switch 4a on the circuit board 4B.

Three of the insertion holes 4k are formed in the circuit board 4B at the locations facing the corresponding first stepped shaft protrusion 5b, the another cylindrical shaft 5t, and the corresponding second stepped shaft protrusion 5e. The diameter of the respective insertion holes 4k is greater than that of the corresponding first stepped shaft protrusion 5b, second stepped shaft protrusion 5e, and cylindrical shaft 5t.

The board cover 5B includes the another cylindrical shaft 5t protruding therefrom inside the housing part 5a. The another cylindrical shaft 5t has a cylindrical wall and one of the fitting protrusions 4s of the position switch 4a inserted into the cylindrical wall.

Clearance C is left respectively between the first stepped shaft protrusion 5b and the corresponding insertion hole 4k, between the second stepped shaft protrusion 5e and the corresponding insertion hole 4k, and between the corresponding another cylindrical shaft 5t and the corresponding insertion hole 4k in a state where the circuit board 4B is mounted to the board cover 5B.

With the above-mentioned configurations, the circuit board 4B is positioned in the housing part 5a of the board cover 5B by the first stepped shaft protrusion 5b, the second stepped shaft protrusion 5e, the shaft protrusion 5p, and the cylindrical shafts 5t via the position switch 4a and the key switch 7.

The position switch 4a or the key switch 7 is supported by an opening edge 5v of a cylindrical portion 5u or a bottom portion 5w of the corresponding cylindrical shaft 5t when a load imposed in a direction normal to the board surface of the circuit board 4B is imposed on the position switch 4a or the key switch 7. The position switch 4a or the key switch 7 is supported by the cylindrical portion 5u of the corresponding cylindrical shaft 5t, the shaft protrusion 5p, the first stepped shaft protrusion 5b and the second stepped shaft protrusion 5e when a load imposed in a direction along the board surface of the circuit board 4B is imposed on the position switch 4a or the key switch 7. As mentioned above, the diameter of the respective insertion holes 4k is greater than that of the corresponding first stepped shaft protrusion 5b, second stepped shaft protrusion 5e, and cylindrical shafts 5t. For this reason, the circuit board 4B can be protected even when the position switch 4a or the key switch 7 is slightly displaced by a load in the direction along the board surface of the circuit board 4B because the load is not imposed on the circuit board 4B due to the clearance C left respectively between the shaft protrusion 5p and the corresponding insertion hole 4k, between the fitting protrusion 4s and the corresponding insertion hole 4k, between the first stepped shaft protrusion 5b and the corresponding insertion hole 4k, between the second stepped shaft protrusion 5e and the corresponding insertion hole 4k, and between the cylindrical shafts 5t and the corresponding insertion holes 4k. Therefore, accurate support of switches such as the position switch 4a and the key switch 7 on the board cover 5B can be achieved and a bad connection between the switches and the circuit board 4B can be prevented.

Although the shift lever device of the present invention has been described based on the first to third embodiments as examples, it is to be noted that the present invention is not limited only to these embodiments and various other embodiments may also be applicable.

What is claimed is:

1. A shift lever device comprising:
   a body case configured to pivotally support a shift lever swingably;
   a circuit board including an electric component disposed on a board of the circuit board;
   a board cover including a housing part housing the circuit board in the board cover and configured to be mounted to the body case with the circuit board being housed in the housing part;
   a board supporting part provided to the board cover and configured to support the circuit board in the housing part; and
   an electric component supporting part provided to any one of the body case and the board cover and configured to support the electric component disposed on the circuit board,
   wherein the circuit board is configured to be supported to the body case via the board cover,
   the electric component includes
   a position switch configured to detect the shift lever being positioned in a parking range position, and
   a solenoid configured to actuate a shift lock mechanism configured to prevent a movement of the shift lever from the parking range position,
   the position switch and the solenoid are disposed on one surface of the circuit board,
   the board cover includes a flange formed on a peripheral portion of the board cover,
   the housing part is formed in the flange,
   the shift lock mechanism is housed in the housing part,
   the body case includes a side wall having an opening for the position switch and the solenoid to be inserted,
   the board cover is engaged with the side wall of the body case so that the position switch and the solenoid are disposed inside the body case via the opening, and
   the circuit board is configured to be supported to the body case via the board cover along the side wall of the body case.

2. The shift lever device according to claim 1, wherein the electric component supporting part is provided to the board cover and includes a support portion configured to abut on a receiver portion provided to the electric component with the circuit board being housed in the housing part.

3. The shift lever device according to claim 1, wherein the electric component supporting part is provided to the body case and includes a support portion configured to abut on a receiver portion provided to the electric component with the circuit board being housed in the housing part and with the board cover being mounted to the body case.

4. The shift lever device according to claim 2, wherein the receiver portion is a through hole formed in the electric component, and the support portion is a stepped shaft tightly disposed in the receiver portion.

5. The shift lever device according to claim 2, wherein the receiver portion is a through hole formed in the electric component, and the support portion is a shaft tightly disposed in the receiver portion.

6. The shift lever device according to claim 2, wherein the receiver portion is a protrusion protruding from the electric component, and the support portion is a cylindrical shaft having a cylindrical wall formed on a distal end of the support portion to fit the protrusion.

7. The shift lever device according to claim 1, wherein the circuit board has a through hole through which the electric component supporting part is disposed and having a diameter greater than a diameter of the electric component supporting part disposed through the through hole.

8. The shift lever device according to claim 1, wherein the housing part includes a claw engaged with the electric component, with the circuit board and the electric component both being housed in the housing part in this order, and the circuit board is configured to be supported in the housing part by an engagement of the claw with the electric component.

9. The shift lever device according to claim 1, wherein the board cover includes a peripheral wall having a fixing claw to engage with a side wall of the body case for maintaining the board cover in the body case.

10. The shift lever device according to claim 1, wherein the board supporting part includes an engaging claw, a flange, and a stepped shaft, respectively protruding from an inside surface of the board cover, the engaging claw includes a hook-like portion to be engaged with the circuit board on a distal end of the engaging claw, the flange and a stepped portion of the stepped shaft have a same protruding dimension protruding from the inside surface of the board cover, and the circuit board is securely mounted between the hook-like portion of the engaging claw, and the flange and the stepped portion.

11. The shift lever device according to claim 1, wherein the circuit board includes a shift lock mechanism disposed thereon.

12. The shift lever device according to claim 1, wherein
the shift lock mechanism includes a lock lever configured to prevent a movement of the shift lever by engaging with a position pin provided on the shift lever, and
the board cover includes an axis protruding from the board cover and rotatably supporting the lock lever.

* * * * *